US009358711B2

(12) United States Patent
Joyner et al.

(10) Patent No.: US 9,358,711 B2
(45) Date of Patent: Jun. 7, 2016

(54) APPARATUS FOR INJECTION MOLDING

(71) Applicants: Van Kent Joyner, West Chester, OH (US); Benjamin Faul Waldman, Batavia, OH (US)

(72) Inventors: Van Kent Joyner, West Chester, OH (US); Benjamin Faul Waldman, Batavia, OH (US)

(73) Assignee: Milacron LLC, Cincinnati, OH (US)

( * ) Notice: Subject to any disclaimer, the term of this patent is extended or adjusted under 35 U.S.C. 154(b) by 196 days.

(21) Appl. No.: 14/289,788

(22) Filed: May 29, 2014

(65) Prior Publication Data
US 2015/0343687 A1 Dec. 3, 2015

(51) Int. Cl.
*B29C 45/64* (2006.01)
*B29C 45/04* (2006.01)
*B29C 45/26* (2006.01)
*B29C 45/66* (2006.01)
B29C 45/17 (2006.01)

(52) U.S. Cl.
CPC ............... *B29C 45/641* (2013.01); *B29C 45/04* (2013.01); *B29C 45/2602* (2013.01); *B29C 45/66* (2013.01); B29C 45/1747 (2013.01); B29C 2045/642 (2013.01)

(58) Field of Classification Search
CPC ............ B29C 45/1747; B29C 45/2602; B29C 45/641; B29C 2045/642
See application file for complete search history.

(56) References Cited

U.S. PATENT DOCUMENTS

| 3,729,283 | A | * | 4/1973 | Eggenberger | ....... B29C 45/6707 425/408 |
| 6,231,329 | B1 | | 5/2001 | Van Keuren, III | |
| 6,733,275 | B2 | | 5/2004 | Fujita | |
| 7,993,129 | B2 | | 8/2011 | Chiang | |
| 8,858,220 | B2 | * | 10/2014 | Sartori | ................... B29C 45/641 425/451.9 |
| 9,096,008 | B2 | * | 8/2015 | Kato | ..................... B22D 17/263 |
| 9,233,498 | B2 | * | 1/2016 | Dirneder | ................. B29C 45/66 |

FOREIGN PATENT DOCUMENTS

| JP | 02-143811 A | 12/1990 |
| JP | 11-129303 A | 5/1999 |

\* cited by examiner

*Primary Examiner* — James Mackey
(74) *Attorney, Agent, or Firm* — Medler Ferro Woodhouse & Mills

(57) ABSTRACT

Apparatus for actuation of split locking nuts of a two platen injection molding machine. Each split locking nut has opposed mating nut halves movable in translation relative to a strain rod therebetween to selectably engage the strain rod. Mating nut halves of two split locking nuts are interconnected by connecting rods to define a pair of split nuts: a master split locking nut driven by an actuator; and a slave split locking nut to which motion is transferred by the connecting rods. Motion of a driven nut half of each master split locking nut is coupled to the opposed mating nut half by at least one coupling mechanism, each comprising a pivot arm and two pivot links interposed between the pivot arm and the opposed mating nut halves whereby translation of a driven nut half is coupled to effect equal and opposite translation of the opposed mating nut half.

19 Claims, 6 Drawing Sheets

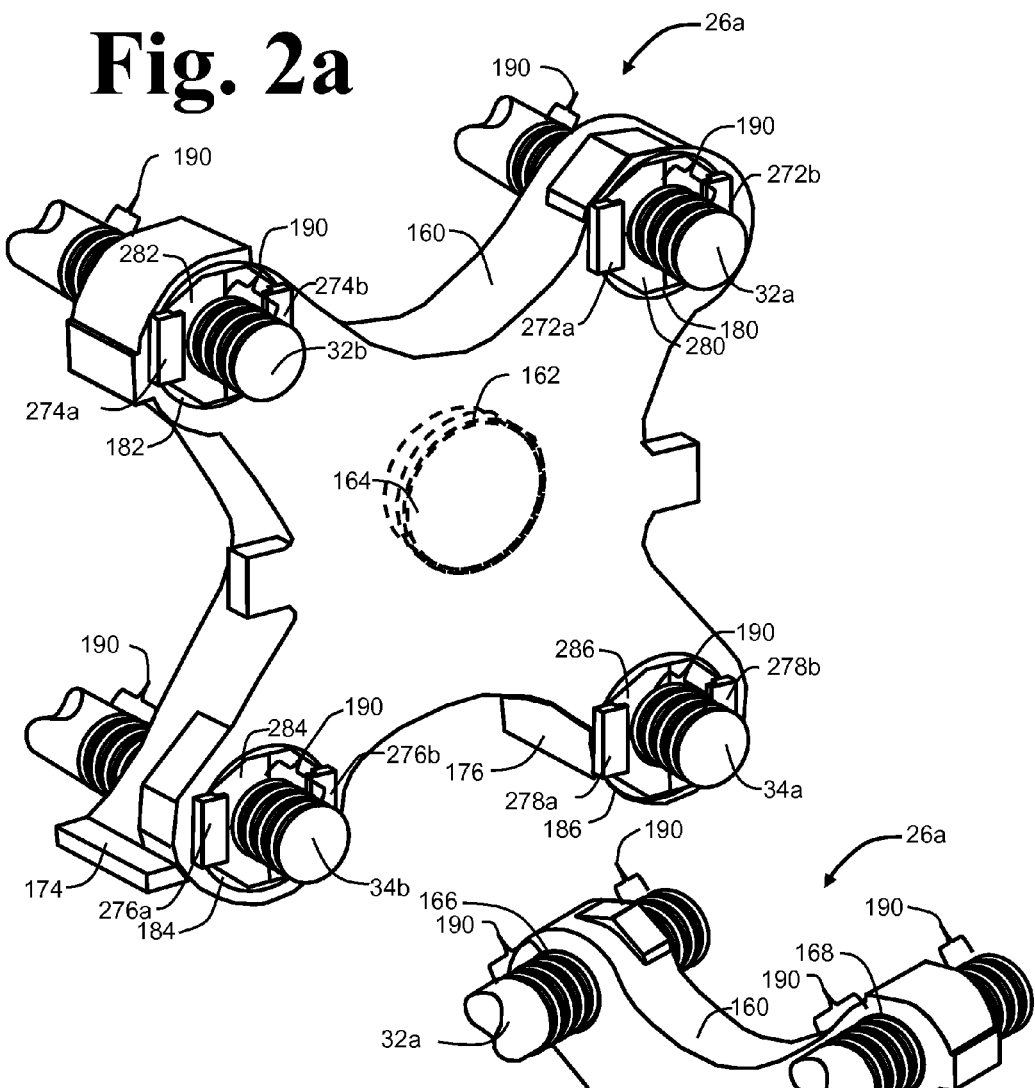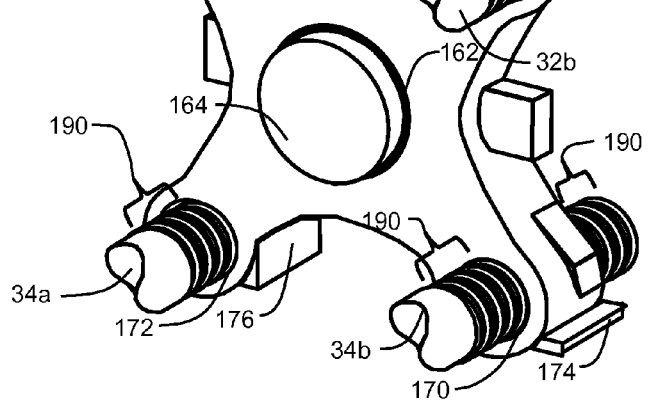

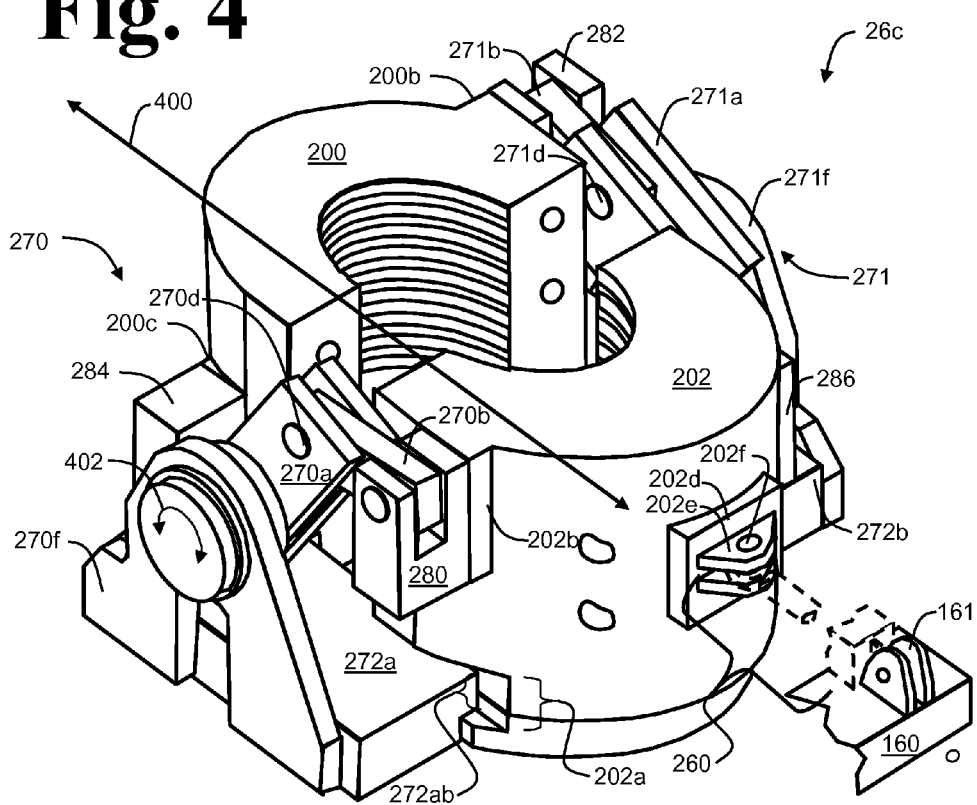

APPARATUS FOR INJECTION MOLDING

BACKGROUND OF THE INVENTION

1. Field of the Invention

This invention relates generally to injection molding machinery and particularly to locking devices in so-called "two platen" clamp units wherein a movable platen assembly comprises a mold member mounting paten and a clamp force actuator member, the locking devices fixing location of the movable platen assembly for injection when mating mold members are seated.

2. Description of Related Art

In so-called "two platen" clamp units of injection molding machines, it is known to provide a stationary platen for supporting first mold components and a movable platen assembly for supporting second (mating) mold components. The movable platen assembly advantageously comprises a mold member mounting platen for supporting second (mating) mold components and a clamp force actuator member connected to the mold member mounting platen so as to apply clamp force to the mold member mounting platen. In such constructions, it is known to rely on split fixing ("locking") nuts for releaseably engaging tie bars (also known as "strain rods") of the clamp unit to fix location of the movable platen assembly relative to the stationary platen for generation of a desired clamp force. Such split locking nuts comprise opposed nut halves movable relative to each other allowing engagement and disengagement of the strain rods. The locking nuts advantageously have internal surface features for engagement with mating external surface features of the strain rods. To fix ("lock") the movable platen assembly in place when mating mold members are engaged, the nut halves are "closed" so that the internal surface features of the locking nuts engage the external surface features of the strain rods to prevent movement of the nuts longitudinally along the strain rods. The locking nuts abut the movable platen assembly whereby, with the mating mold members engaged, the movable platen assembly is locked in place. With the nut halves "closed" and mating mold components seated, force applied to the mold mounting platen of the moveable platen assembly by the clamp force actuator is transferred through the movable platen assembly and reaction force at the locking nuts is transferred to the strain rods to effect application of a desired clamping force on the mating mold members for injection molding. The aforesaid two platen clamp units customarily have four strain rods and four split locking nuts together with actuators for engaging and disengaging the nut halves with the strain rods. Known constructions of such locking nuts wherein locking nuts are arranged in pairs of two interconnected locking nuts rely on coupling mechanisms to couple motion of one mating nut half to the opposed mating nut half and connecting rods to transfer motion of mating nut halves of a driven ("master") split locking nut to corresponding mating nut halves of a "slave" split locking nut. Known coupling mechanisms in such arrangements comprise members that engage pins in slots allowing sliding of the pin within the slot with attendant wear and lost motion. Hence, there is a need for improved split locking nut arrangements that overcome deficiencies of known constructions.

SUMMARY OF THE INVENTION

It is an object of the present invention to improve actuation of split locking nuts of a clamp unit of a two platen injection molding machine wherein split locking nuts are arranged in pairs, each pair comprising a master split locking nut driven by an actuator and a slave split locking nut to which motion of mating nut halves of the master split locking nut is transferred, wherein at least one coupling mechanism comprising a pivot arm and pivot links extending from opposed ends of the pivot arm couples translation of a driven nut half of each master split locking nut to the opposed mating nut half.

It is a further object of the present invention to improve actuation of split locking nuts of a clamp unit of a two platen injection molding machine wherein split locking nuts are arranged in pairs, each pair comprising a master split locking nut driven by an actuator and a slave split locking nut to which motion of mating nut halves of the master split locking nut is transferred, so that forces applied by a coupling mechanism coupling translation of a driven nut half of a master split locking nut to the mating nut half produce opposed moments so as to reduce cocking and tipping of the mating nut half.

It is a still further object of the present invention to improve actuation of split locking nuts of a clamp unit of a two platen injection molding machine wherein split locking nuts are arranged in pairs, each pair comprising a master split locking nut driven by an actuator and a slave split locking nut to which motion of mating nut halves of the master split locking nut is transferred, so that forces transferred from a nut halves of a master split locking nut to nut halves of a slave split locking nut produce opposed moments so as to reduce cocking and tipping of the nut halves of the slave split locking nut.

Further objects and advantages of the present invention shall become apparent from the following written description and the accompanying drawings.

In accordance with the aforesaid objects, the invention provides an apparatus for actuation of split locking nuts of a clamp unit of a two platen injection molding machine, the clamp unit comprising: a fixed platen for supporting mold members; a movable platen assembly for supporting mating mold members; and a plurality of strain rods spanning from the fixed platen through the moveable platen assembly, the movable platen assembly comprising a mold supporting platen for supporting mating mold members, an actuator housing comprising a clamp force actuator, and a plurality of split locking nuts, each split locking nut comprising opposed movable nut halves for releaseably engaging the strain rods, the number of split locking nuts being no less than the number of strain rods, the apparatus comprising: connecting rods for connecting nut halves of two split locking nuts so as to define interconnected pairs of split locking nuts, each pair comprising a master split locking nut comprising a nut half driven by an actuator and a slave split locking nut interconnected with the master split locking nut by the connecting rods; at least one coupling mechanism for coupling motion of a driven nut half of each master split locking nut to the opposed mating nut half of the master split locking nut, wherein each coupling mechanism comprises a pivot arm and two pivot links, the pivot arm being rotatably supported so as to rotate relative to an axis of rotation fixed in position relative to the actuator housing and each pivot link being pivotably connected at one end thereof to an end of the pivot arm and pivotably connected at the distal end thereof to a mating nut half so that rotation of the pivot arm effects rotation and translation of the pivot links to couple translation of the driven nut half to equal and oppositely directed translation of the opposed mating nut half; and, an actuator for each driven nut half for effecting translation of the driven nut half toward and away from an associated strain rod, each actuator operably connected between a driven nut half and the actuator housing. Advantageously, at least two side blocks are fixed to the actuator housing in position relative to opposite sides of each strain rod to be selectably engaged by a split locking nut, the side blocks engaging the opposed mating nut halves of each split locking nut so as to restrain movement thereof bi-directionally to effect opening and closing of the split locking nuts.

BRIEF DESCRIPTION OF THE DRAWINGS

FIGS. 2a and 2b illustrate the clamp force actuator of the movable platen assembly of the injection molding machine of FIG. 1.

FIG. 4 illustrates an arrangement of coupling mechanisms associated with mating nut halves in accordance with the invention.

DETAILED DESCRIPTION OF THE PREFERRED EMBODIMENT

The invention shall be illustrated with reference to a preferred embodiment which shall be described in detail. It is not the intention of applicant that the invention be limited to the preferred embodiment, but rather that the invention shall be defined by the appended claims and all equivalents thereof.

Plastics Processing Machine & Equipment

For purposes of illustrating the invention, an injection molding machine and control shall be described in detail. Control of the injection molding machine is effective to achieve performance of a machine cycle of operation to produce molded articles from thermoplastic raw material. A conventional machine cycle of operation for injection molding comprises conversion of raw material in solid form to a highly viscous, homogeneous form (so-called "melt") suitable for injection, accumulation of a predetermined quantity of melt, forcing ("injecting") melt into mold cavities, "curing" the material within the mold cavities to a sufficiently solid condition and removing the solidified molded articles. Mold cavities are created by abutment ("seating") of mating mold components and the machine cycle of operation includes abutment of mating mold components for filling of mold cavities and separation of mating mold components for removing molded articles.

Figure 1:
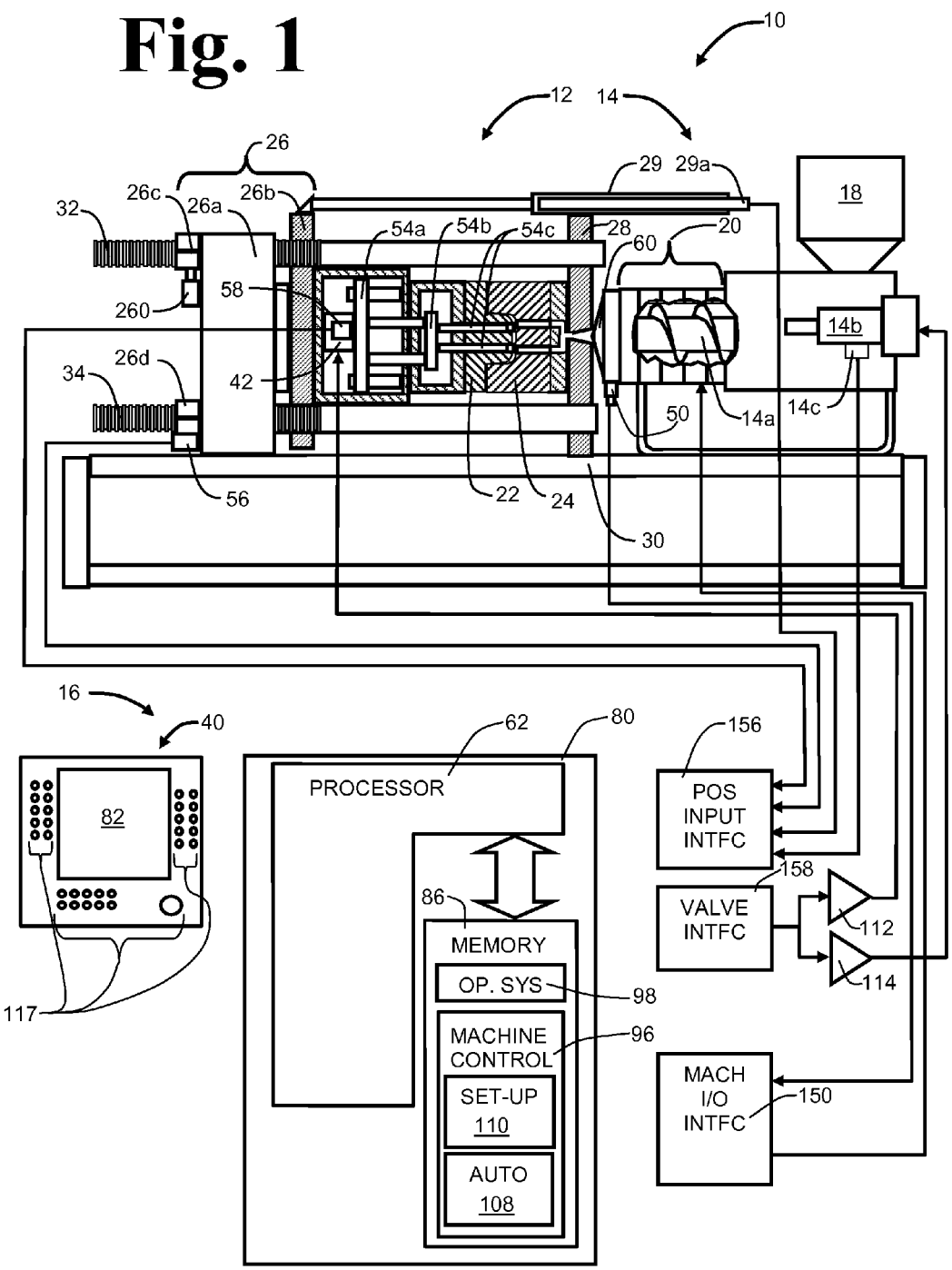
FIG. 1 illustrates an injection molding machine and control comprising an environment for the locking nut arrangements of the present invention.

Referring to FIG. 1, an injection molding machine 10 includes a clamp unit 12 and an injection unit 14. Typical of plastic injection molding machines, raw material in the form of pellets and/or powders is introduced to injection unit 14 through hopper 18. Injection unit 14 includes a barrel portion 60, typically surrounded by external heating elements 20, and an internal material working screw 14a shown in the cutaway of injection unit 14. Raw material entering barrel portion 60 from hopper 18 is melted, i.e., plasticized, by a combination of heating and material working. Material heating is effected partially by means of heater elements 20 and partially by friction and shear effected by rotation of material working screw 14a. Plasticized material (so-called "melt") is conveyed by rotation of the working screw toward the exit end of barrel portion 60, i.e., the end in communication with clamp unit 12, displacing working screw 14a away from clamp unit 12. Rotation of the material working screw 14a of injection unit 14 is effected by a rotating machine (not shown), for example, an electrically or hydraulically powered motor wherein an armature is rotated relative to a stator. Advantageously, that rotating machine is servo controlled, i.e., is operated in combination with a transducer effective to produce signals useful for regulation of the speed of rotation of screw 14a. Once a sufficient volume of material has been plasticized according to the articles to be molded, working screw 14a is advanced within barrel portion 60 to force melt through the exit thereof into a cavity or cavities defined by mating mold subassemblies 22 and 24. Each of mold subassemblies 22 and 24 advantageously comprise a so-called "mold base" supporting a so-called "mold die" defining a portion of the mold cavities created by abutment of the mating mold subassemblies 22 and 24. Immediately following injection of melt into the mold cavities, force applied to working screw 14a is maintained at a sufficient level to prevent excessive shrinkage of melt as it solidifies within the mold cavities. Immediately prior to separation of mold subassemblies 22 and 24, force applied to working screw 14a is relieved so as to prevent expulsion of melt from the exit end of barrel portion 60 when mold subassemblies 22 and 24 are separated. Translation of material working screw 14a is effected by actuators such as hydraulic actuator 14b, wherein movement of a piston within a cylinder is coupled to move working screw 14a within barrel portion 60. Advantageously, actuator 14b is servo controlled, i.e., operated in connection with a transducer, such as transducer 14c, suitable for measuring translational position of material working screw 14a relative to barrel portion 60. Servo control of actuator 14b is effective for regulating the speed of, at least, advance of material working screw 14a during injection of melt into mold cavities and for regulating force acting on material working screw 14a as melt cures within the mold cavities.

Continuing with reference to FIG. 1, clamp unit 12 comprises stationary ("fixed") platen 28 and movable platen assembly 26, comprising clamp force actuator subassembly 26a and mold member mounting platen 26b. Clamp force actuator subassembly 26a comprises a clamp force actuator (not shown in FIG. 1) connected to mold mounting platen 26b and split locking nuts such as split locking nuts 26c and 26d. Clamp force actuator subassembly 26a is supported by rails of machine base 30 and is movable relative to clamp unit strain rods, such as comprise strain rod pairs 32 and 34, spanning from fixed platen 28 through movable platen assembly 26. Clamp unit 12 holds mold subassemblies 22 and 24 in abutment during injection and thereafter until melt has sufficiently solidified to be removed without unacceptable deformation. Fixed platen 28 supports mold subassembly 24 and is rigidly mounted to machine base 30. Strain rods of strain rod pairs 32 and 34 are supported at opposite ends by fixed platen 28 and movable platen assembly 26. Movable platen assembly 26 is slidably movable relative to strain rod pairs 32 and 34 for reciprocation between "open" and "closed" positions, "closed" referring to the advanced position wherein mating mold components form at least one cavity for producing molded articles. As shown in FIG. 1 mating mold subassemblies 22 and 24 are abutted corresponding to the "closed" position of clamp unit 12. Movable platen assembly 26 is reciprocated between "open" and "closed" positions by actuators such as actuator 29, advantageously a hydraulically operated piston and cylinder actuator, supported by fixed platen 28 and mold member mounting platen 26a. Position of movable platen assembly 26 is measured by position transducer 29a, advantageously a linear position transducer producing electrical signals representing position of movable platen assembly 26.

Continuing with reference to FIG. 1, with mold member subassemblies 22 and 24 abutted, locking nuts such as locking nuts 26c and 26d are operated to engage the strain rods of strain rod pairs 32 and 34 to prevent movement of movable platen assembly 26 away from fixed platen 28. Each locking nut comprises opposed mating nut halves movably supported on clamp force actuator sub assembly 26a. Actuators are associated with pairs of split locking nuts such as actuator 260 associated with the pair of split locking nuts 26c and 26d. Position monitors such as position monitor 56 are associated with the split locking nuts to produce signals representing the relative position of the mating nut halves. Actuator 260 provides motive power to one mating nut half of a "master" split locking nut, such as split locking nut 26c, motion of that nut half is coupled to the opposed mating nut half by coupling mechanisms to effect motion in the opposite direction of the driven nut half and motion of the mating nut halves of the "master" split locking nut is transferred by, for example, connecting rods (not shown in FIG. 1) to the mating nut halves of a "slave" split locking nut such as split locking nut 26d. Advantageously, actuator 260 is servo controlled, i.e., works in combination with signals representing position produced by position monitor 56 to effect control of actuator 260.

Continuing with reference to FIG. 1, split locking nuts such as split locking nuts 26c and 26d remain engaged with the strain rods throughout injection and curing of melt. Once sufficient time has elapsed to permit release of molded articles, the split locking nuts are disengaged from the strain rods to allow movement of movable platen assembly 26 away from fixed platen 28. The clamp force actuator of clamp force assembly 26a advantageously comprises a hydraulically operated piston and cylinder characterized by a relatively short stroke length and relatively large piston and cylinder diameter, i.e., a so-called "pancake cylinder". With split locking nuts such as split locking nuts 26c and 26d engaged with the strain rods, force exerted by the clamp force actuator on mold mounting platen 26b is transferred through mold member mounting platen 26b to mating mold assemblies 22 and 24 and the generated reaction force is transferred by clamp force actuator sub assembly 26a to the split locking nuts to place the strain rods under strain. The transferred reaction force can result in elastic stretching of strain rods of strain rod pairs 32 and 34. In this manner, a clamping force is created sufficient to prevent separation of mold member subassemblies 22 and 24 during melt injection and curing. Clamp force is reduced in preparation for separation of mold member subassemblies and with clamp force so reduced, the split locking nuts are disengaged from the strain rods to permit movement of movable platen assembly 26 away from fixed platen 28.

Continuing with reference to FIG. 1, a power operated ejector mechanism 54 is illustrated in FIG. 1 disposed between mold member mounting platen 26b and the mold die comprising mold subassembly 22. Ejector mechanism 54 effects translation of movable members in mold subassembly 22 to dislodge a molded article from the mold die of mold member subassembly 22. An actuator 42 provides motive force for ejector mechanism 54 through ejector bar 54a. A position transducer such as position transducer 58 produces signals representing position of the ejector bar 54a. Translation of ejector bar 54a is coupled to an ejector plate 54b from which ejector pins 54c project. Translation of ejector bar 54a advances ejector pins to extend beyond a molding surface and retracts ejector pins 54c so that the free ends thereof are flush with the same molding surface. Position transducer 58 may be a linear position transducer driven by either actuator 42 or by movement of ejector bar 54a; or, a rotary position transducer, advantageously driven by actuator 42 under circumstances where actuator 42 comprises a rotating member.

Although not shown in FIG. 1, it is to be understood that for equipment having hydraulically actuated devices, a conventional combination of a pump and reservoir comprise a facility for supplying pressurized hydraulic fluid to and recovering hydraulic fluid from such devices. Valves are used to control flow of the hydraulic fluid so as to be re-circulated from the reservoir to the hydraulically actuated devices and back to the reservoir. Likewise, although not shown in FIG. 1, in instances where electrically operated devices actuate machine mechanisms, electrical energy is connected to the equipment and application of electrical energy is controlled by combinations of electromechanical devices such as relays and mechanical switches and, electronic devices such as amplifiers and current switching elements.

Machine Control

The preferred embodiment of a machine control system is depicted as control system 16 comprising: operator station 70 comprising display device 82, advantageously a touch screen display facilitating data entry, and operator buttons 117; program controlled processor 80 comprising digital processor 62 and memory 86 comprising mass storage capacity for programs and data and temporary storage capacity suitable for support of high speed processing by digital processor 62; and, interface circuits such as position input interface circuits 156, valve interface circuits 158 and machine input and output interface circuits 150. As is conventional, data processing functions performed by programmed controlled processor 80 are controlled by operating system programs 98 controlling execution of "application" programs such as machine control programs 96. Machine control 16 produces signals for controlling the operation of machine devices, such as actuators and/or motors which actuate mechanisms of the injection molding machine, heaters 20 and other devices not shown but typical of such machines and associated equipment. Output signals defining, for example, position, velocity, and/or acceleration are conditioned as appropriate at valve interface circuits 158 and applied to hydraulic valve amplifiers 112 and 114 to control electrical current from a suitable power source and delivered to actuators operating valves that control flow of hydraulic fluid to and from mechanism actuators such as actuators 14b, 29, 42 and 260. As is conventional, signals produced by position transducers 14c, 29a, and 58 and position monitor 56 are used for control of actuators 14b, 29, 42 and 260. Outputs of transducers 14c, 29a, and 58 and monitor 56 are conditioned for use by digital system 80 by position transducer interface circuits 156. Machine input/output interface circuits 150 perform signal conditioning for signals produced by or applied to machine devices including without limitation electrical heating elements 20, mechanically operated switches, solenoids, relays, proximity sensors, temperature sensors and pressure sensors.

Continuing with reference to FIG. 1, machine control programs 98 comprise programs supporting both machine set-up, i.e., Set-Up programs 108, and automatic operation, i.e., "Auto" programs 110. During machine set-up, user entry of parameter data appropriate to the material and articles being molded is enabled. Data entry can be effected manually using the touch screen of display 82 or by selection of a pre-recorded "menu" of parameter data. Automatic operation enables repeated execution of a machine cycle of operation effective to process raw material and produce molded articles. As is conventional, automatic operation will continue until ceased by any of completion of a predetermined number of machine cycles of operation, user intervention or detection of an out-of-tolerance condition of a machine component requiring attention, adjustment, repair or replacement. Examples of out-of-tolerance conditions include, but are not limited to: insufficiency of raw material at hopper 18, unacceptable temperatures at any of heaters 20 as detected by temperature sensor 50, unacceptable rate of rotation of working screw 14a, out-of-tolerance position of any of working screw 14a, movable platen 26, actuator 42 and actuator 260 and out-of-tolerance force acting on working screw 14a. Advantageously, machine control programs 98 support display of so-called "alarms" at display 82 indicative of selected out-of-tolerance conditions. While manufacturer's settings can cause immediate interruption of automatic execution in the event certain faults are detected, it is also contemplated that in the course of machine set-up, user's can select responses including cessation of automatic operation in the event of detection of certain out-of-tolerance conditions. In either case, machine control programs 98 prohibit resumption of automatic operation until the fault or out-of-tolerance condition is overcome through user action.

A mold clamp actuator of a movable platen assembly shall be described with reference to FIGS. 2a and 2b. Mold clamp actuator subassembly 26a comprises actuator housing 160 in which are disposed an actuator cylinder 162 (shown hidden (dashed line) in FIG. 2a) and actuator ram (piston) 164 (shown hidden (dashed line) in FIG. 2a) and bores 166-172 through which pass strain rods 32a, 32b, 34a and 34b of strain rod pairs 32 and 34. Actuator cylinder 162 and actuator piston 164 are characterized by large diameters relative to stroke distance as known in so-called "pancake" cylinder actuators. Displacement of actuator piston 164 within actuator cylinder 162 is advantageously effected by application of pressurized hydraulic fluid. Movable mold mounting platen 26b is advantageously attached to ram 164 by fasteners (not shown). Mold clamp actuator 29 is operated to effect motion of mold movable platen assembly 26 relative to fixed platen 28, clamp force actuator subassembly 26a and movable mold mounting platen 26b moving together in response to force applied by mold clamp actuator 29. With movable mold mounting platen 26b advanced to bring mating mold member components proximate for abutment, split locking nuts are operated to engage the strain rods to prevent displacement of actuator housing 160. The mold clamp actuator is then operated to advance mold mounting platen 26b relative to actuator housing 160 so as to seat mating mold components. Clamping force is applied to mold mounting platen 26b by the pancake cylinder of clamp force actuator subassembly 26a, i.e., by application of pressurized hydraulic fluid to piston 164, force acts on actuator housing 160 and on piston 164 and that force is applied to mold mounting platen 26b. The reaction force produced by pressurization of the pancake cylinder acts through actuator housing 160 and is transferred by the split locking nuts to strain rods 32a-34b of strain rod pairs 32 and 34.

Continuing with reference to FIGS. 2a and 2b, actuator housing 160 further comprises guides 174 and 176 for contacting rails comprising machine base 30. Actuator housing 160 is slidably supported on machine base rails (not shown) by guides 174 and 176 so as to allow strain rods 32a, 32b, 34a and 34b to pass freely through, respectively, bores 166, 168, 170 and 172. Advantageously, bosses, such as bosses 180, 182, 184 and 186 surround the intersection of, respectively, bores 166, 168, 170 and 172 with the face of actuator housing 160 on which the split locking nut operating device is mounted. Bosses 180-186 provide flat reference surfaces for movable split locking nut halves (not shown in FIGS. 2a and 2b) that engage strain rods 32a, 32b, 34a and 34b of strain rod pairs 32 and 34. As shown in FIGS. 2a and 2b, portions of strain rods 32a, 32b, 34a, and 34b passing through actuator housing 160 comprise surface features such as grooves 190 that are engaged with mating internal surface features of split locking nuts when the split locking nuts are "closed" on strain rods 32a, 32b, 34a and 34b. In the vicinity of each of bosses 180-186, side blocks such as side blocks 272a, 272b, 274a, 274b, 276a, 276b, 278a and 278b are arranged in pairs on opposite sides of strain rods 32a, 32b, 34b and 34a, respectively and fixedly attached to actuator housing 160. Side blocks 272a-278b restrain movement of mating nut halves of split locking nuts that selectably engage strain rods 32a, 32b, 34b and 34a, as is further described herein. Additionally shown in FIG. 2a, wear pads, such as wear pads, 280, 282, 284 and 286, are fixedly attached to actuator housing 160 overlying bosses 180, 182, 184 and 186, respectively. Wear pads 280-286 are advantageously configured in four independent segments facilitating replacement of worn segments with retention of segments for which wear has not reached an extent requiring replacement. Wear pads 280-286 are located to serve as wear surfaces between actuator housing 160 and the facing bottom surfaces of moveable mating nut halves as is more fully described elsewhere herein.

Figure 3A:
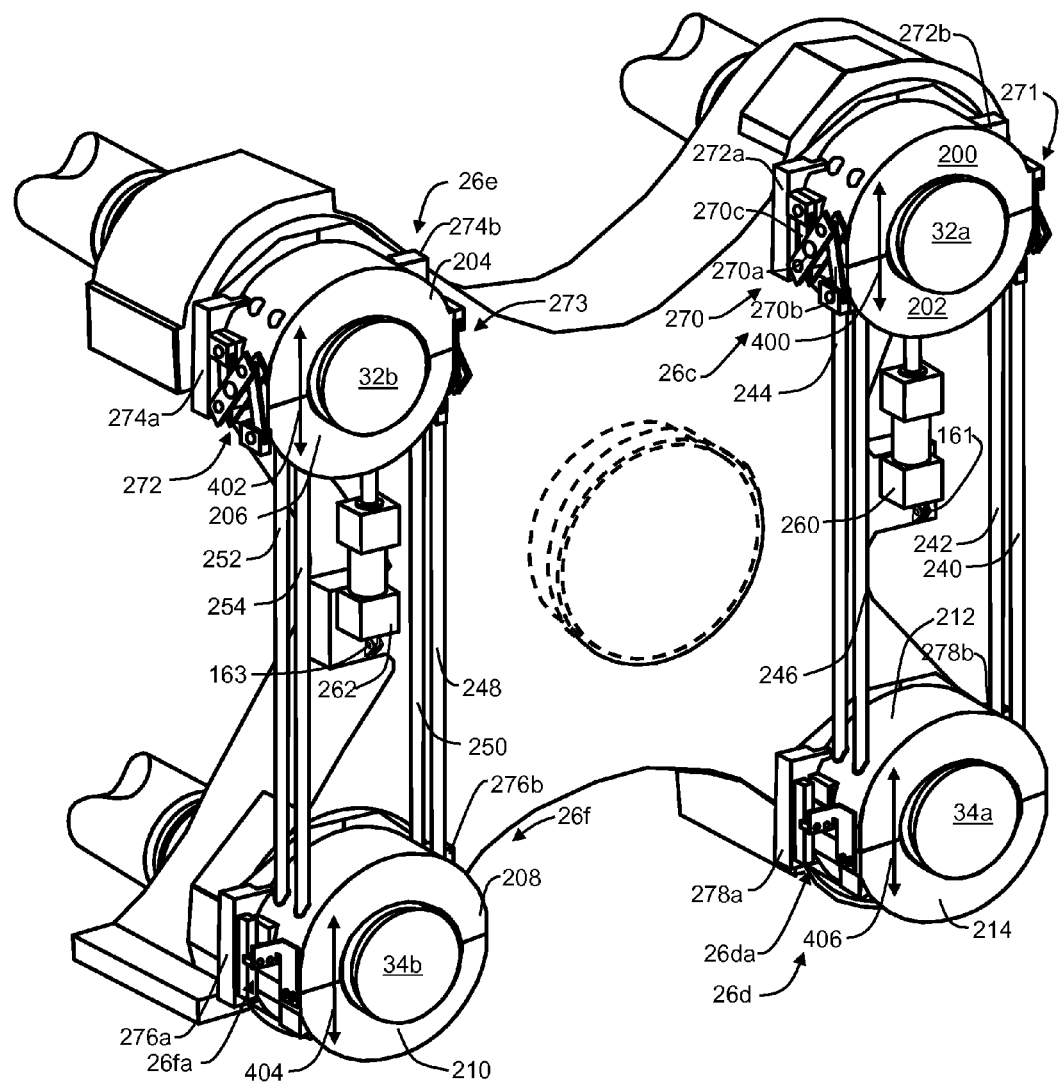
FIGS. 3a and 3b illustrate an arrangement of split locking nuts in accordance with the invention.
Figure 3B:
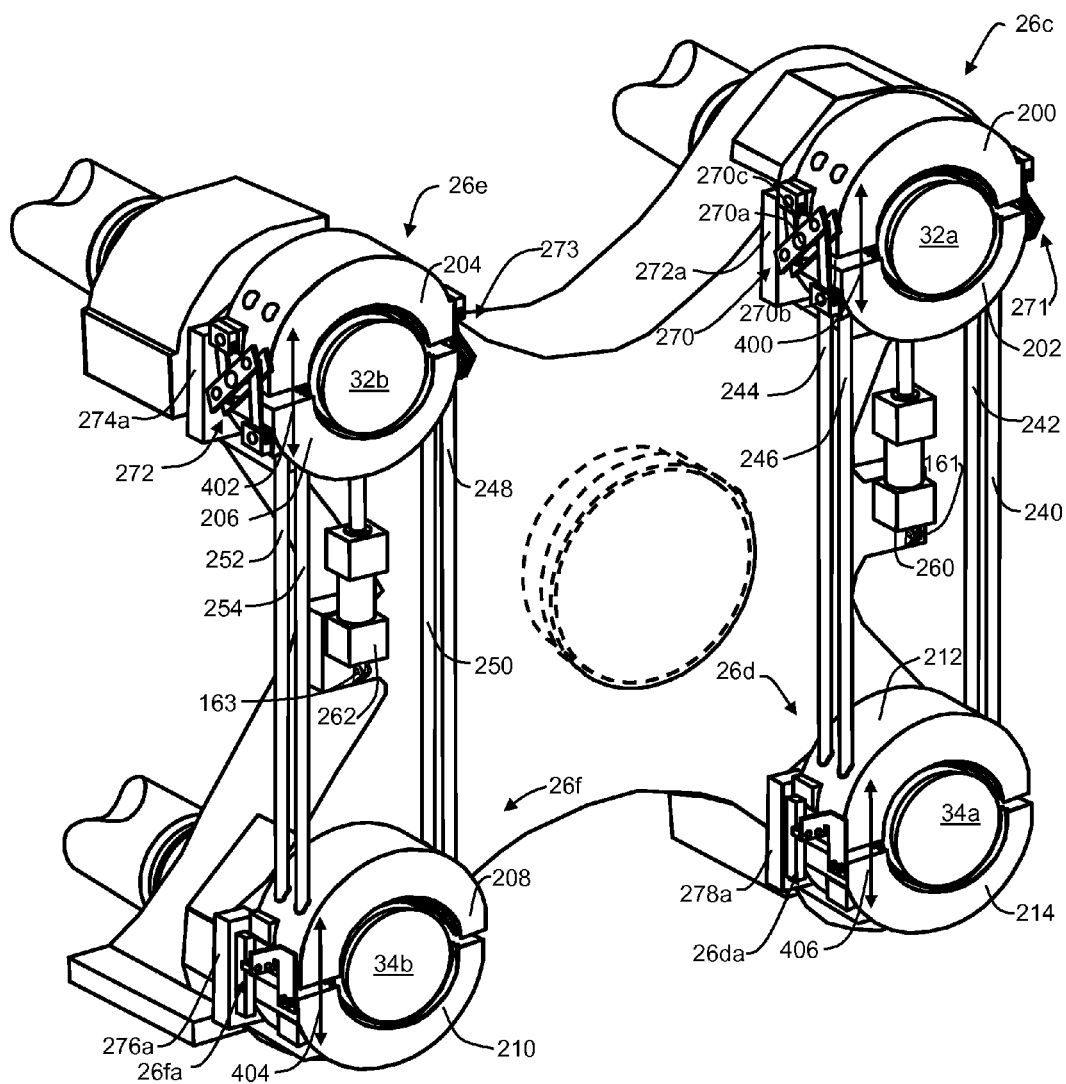

A strain rod locking mechanism in accordance with the present invention shall be described with reference to FIGS. 3a and 3b. Each of split locking nuts 26c, 26d, 26e and 26f have translating nut halves moveably supported from actuator housing 160 so as to be moveable relative to an associated strain rod. Side blocks 272a-278b engage mating nut halves so as to restrain movement thereof bi-directionally substantially parallel to the directional arrows 400, 402, 404 and 406, such movement referred to herein as translation of nut halves. With mating nut halves 200 and 202 of split locking nut 26c abutted and mating nut halves 212 and 214 of split locking nut 26d abutted (as shown in FIG. 3a), split nuts 26c and 26d are "closed". That is, mating nut halves 200 and 202 engage strain rod 32a and mating nut halves 212 and 214 engage strain rod 34a so as to restrain movement of those split nuts relative to those strain rods. Likewise, with split nuts 26e and 26f "closed", mating nut halves 204 and 206 engage strain rod 32b and mating nut halves 208 and 210 engage strain rod 34b so as to restrain those split nuts relative to those strain rods. Conversely, with split nuts 26c, 26d, 26e and 26f "open" as shown in FIG. 3b, mating nut halves 200 and 202 are disengaged from strain rod 32a; mating nut halves 212 and 214 are disengaged from strain rod 34a; mating nut halves 204 and 206 are disengaged from strain rod 32b; and, mating nut halves 208 and 210 are disengaged from strain rod 34b. Hence, with split nuts 26c, 26d, 26e and 26f "open", movable platen assembly 26 is not restrained from movement relative to strain rods 32a, 32b, 34a and 34b. A single actuating device is associated with one split nut of connected split nut pairs, that split nut functioning as the "master" of each connected split nut pair. In particular, linear actuator 260 acts directly on mating nut half 202 of split nut 26c to effect translation of that nut half toward and away from strain rod 32a and linear actuator 262 acts directly on nut half 206 of split nut 26e to effect translation of that mating nut half toward and away from strain rod 32b. As illustrated, actuators 260 and 262 are conventional hydraulically or pneumatically operated piston/cylinder type actuators in which pressurized fluid is used to effect movement of a piston within a cylinder and the piston is connected with a push rod projecting beyond the cylinder.

Continuing with reference to FIGS. 3a and 3b, nut halves of split locking nuts 26c and 26d are connected by connecting rods 240, 242, 244 and 246. Nut halves of split locking nuts 26e and 26f are connected by connecting rods 248, 250, 252 and 254. Connecting rods 240-246 are effective to maintain fixed separation between correspondingly situated nut halves, i.e., connecting rods 240-246 maintain fixed separation between nut halves 200 and 212 and between nut halves 202 and 214. Likewise, connecting rods 248-254 maintain fixed separation between nut halves 204 and 208 and between nut halves 206 and 210. Connecting rod 240 is fixedly connected to mating nut half 200, passes freely through mating nut half 202 and is fixedly connected to mating nut half 212. Connecting rod 242 is fixedly connected to mating nut half 202, passes freely through mating nut half 212 and is fixedly connected to mating nut half 214. Connecting rod 246 is fixedly connected to mating nut half 202, passes freely through mating nut half 212 and is fixedly connected to mating nut half 214. Connecting rod 244 is fixedly connected to mating nut half 200, passes freely through mating nut half 202 and is fixedly connected to mating nut half 212. Connections of connecting rods 248-254 correspondingly interconnect mating nut halves 204-210 of split locking nuts 26e and 26f. The arrangement of connections of connecting rods 240-246 is effective to produce equalized opposing moments from forces transferred from master split locking nut 26c to slave split locking nut 26d. Likewise, the arrangement of connections of connecting rods 248-254 is effective to produce equalized opposing moments from forces transferred from master split locking nut 26e to slave split locking nut 26f. With the transfer of forces, when nut half 202 is translated toward or away from strain rod 32a by actuator 260, connecting rods 242 and 246 are effective to move nut half 214 through the same distance and in the same direction as nut half 202. Likewise, when nut half 206 is moved toward or away from strain rod 32b by actuator 262, connecting rods 250 and 254 are effective to move nut half 210 through the same distance and in the same direction as nut half 206. By the arrangement of connecting rods, opening and closing of split nut 26d is effectively "slaved" to opening and closing of split nut 26c. Likewise, opening and closing of split nut 26f is "slaved" to opening and closing of split nut 26e. Relative position of mating nut halves of split locking nuts 26d and 26f is monitored by position monitoring devices comprising position monitor 56 of FIG. 1 such as position measuring devices 26da and 26fa.

Continuing with reference to FIGS. 3a and 3b, coupling mechanisms in accordance with the invention couple movement of the driven nut half of each "master" split nut to the mating nut half of the same split nut so as to effect movement of the mating split nut halves through the same distance and in the opposite direction. Two coupling mechanisms are connected to mating nut halves of each of master split nuts 26c and 26e. Coupling mechanisms 270 and 271 couple movement of nut half 202 to mating nut half 200; coupling mechanisms 272 and 273 couple movement of nut half 206 to mating nut half 204. By virtue of connecting rods transferring motion from "master" split nuts to "slave" split nuts, coupled movement of mating nut halves is transferred to the correspondingly situated nut halves of "slaved" split nuts 26d and 26f. Directly actuated movement of nut halves 202 and 206 is transferred by connecting rods to nut halves 214 and 210 respectively. Likewise, coupled movement of nut halves 200 and 204 is transferred by connecting rods to nut halves 212 and 208, respectively. With the transfer of forces, when mating nut half 200 is translated toward or away from strain rod 32a by coupled motion of mating nut half 202, connecting rods 240 and 244 are effective to move nut half 212 through the same distance and in the same direction as nut half 200. Likewise, when mating nut half 204 is moved toward or away from strain rod 32b by coupled motion of mating nut half 206, connecting rods 248 and 252 are effective to move nut half 208 through the same distance and in the same direction as nut half 204. Hence, actuator 260 is effective to separate and abut mating nut halves of split nuts 26c and 26d and actuator 262 is effective to separate and abut mating nut halves of split nuts 26e and 26f.

As seen in FIGS. 3a and 3b, actuators 260 and 262 are connected between actuator housing 160 at the sides thereof and the driven nut halves of split nuts 26c and 26e. The translatable members of actuators 260 and 262 (push rods as shown in FIGS. 3a and 3b) are connected to, respectively, nut halves 202 and 206 so as to apply translating forces thereto. That is, application of forces by actuators 260 and 262 to, respectively, nut halves 202 and 206, are effective to translate those nut halves in directions substantially parallel to direction arrows 400 and 402 owing to the restraint of motion of those nut halves by side blocks 272a, 272b, 274a and 274b. As shown in FIGS. 3a and 3b, actuators 260 and 262 are advantageously affixed to actuator housing 160 by, respectively, pivot connections 161 and 163 allowing pivot of actuators 260 and 262 relative to actuator housing 160 in planes substantially perpendicular to the face of actuator housing 160. Further, while not shown in FIGS. 3a and 3b, actuators 260 and 262 are advantageously connected to, respectively, nut halves 202 and 206, by pivot connections allowing pivot of actuators 260 and 262 in a plane substantially parallel to the face of actuator housing 160. Use of such pivot connections accommodates misalignment of the actual axis of translation of the translatable members (push rods) of actuators 260 and 262 relative to the axes of translation of driven nut halves 202 and 206 as restrained by side blocks 272a, 272b and 274a and 274b, respectively, so as to avoid binding of the translatable members of the actuators.

Construction and arrangement of the coupling mechanisms that couple movement between mating nut halves of "master" split locking nuts shall be described with reference to FIG. 4 illustrating mating nut halves 200 and 202 of split locking nut 26c. As noted with reference to FIGS. 3a and 3b, each split nut is associated with two coupling mechanisms. Split nut 26c is associated with coupling mechanisms 270 and 271. Movement of mating nut halves 200 and 202 is guided and restrained by side blocks 272a and 272b which are fixedly mounted to actuator housing 160 so as to partially engage slots in the lower outside surface of each of mating nut halves 200 and 202 (slot 202a of mating nut half 202 is shown in FIG. 4). Projection 272ab of side block 272a is shown projecting into slot 202a. Projection 272ab extends along the side of side block 272a facing mating nut halves 200 and 202 (as illustrated in FIG. 2a). A corresponding slot (not shown) of mating nut half 200 receives projection 272ab. Likewise, a projection (not shown in FIG. 4) of side block 272b is received in slots in mating nut halves 200 and 202 so that side blocks 272a and 272b restrain movement of mating nut halves so as to be substantially in the direction of double ended arrow 400. Advantageously, wear pads are fitted to side blocks 272a and 272b at locations of contact of the projections thereof with faces of the associated slots of mating nut halves 200 and 202. As described with reference to FIG. 2a, replaceable wear pads 280-286 mounted to actuator housing 160 are in sliding contact with the bottom surfaces of mating nut halves of split locking nuts 26c-26f. Hence, replaceable wear pads are advantageously located to accommodate sliding contact of mating nut halves with side blocks 272a-278b and with actuator housing 160.

Continuing with reference to FIG. 4, upper side boss 202b projects from the exterior sidewall of nut half 202 proximate the top surface thereof. Corresponding upper side boss 200b projects from the exterior sidewall of nut half 200 proximate the top surface thereof. Lower side boss 200c projects from the exterior sidewall of nut half 200 proximate the top of the slot in the sidewall. A corresponding lower side boss (not shown in FIG. 4) projects from the exterior sidewall of nut half 202 proximate the top of the slot therein. Receiving forks 280 and 282 are fixed to upper side bosses 202b and 200b, respectively. Receiving fork 284 is fixed to lower side boss 200c and receiving fork 286 is fixed to the lower side boss of nut half 202. A pivot arm, such as pivot arms 270a and 271a, is pivotably supported from an upright support such as upright support 270f attached to side block 272a (pivot arm 271a is pivotably supported by upright support 271f attached to side block 272b). The pivot axis of each pivot arm is fixed in position relative to strain rod 32a by virtue of attachment of the upright support to a side block and by virtue of attachment of the side blocks to actuator housing 160. The pivot axis of each pivot arm (represented by rotational double ended arrow 402) is located at the longitudinal midpoint of the pivot arm. Two pivot links, such as pivot links 270b and 270c (see FIGS. 3a and 3b) are each pivotably connected to the pivot arms at opposite ends thereof. The distal ends of each pivot link are pivotably connected to receiving forks, such as receiving forks 280-286 fixed to mating nut halves 200 and 202 (in FIG. 4: distal end of pivot link 270b shown received in receiving fork 280; distal end of pivot link 271b shown received in receiving fork 282). The distal end of each pivot link received in receiving forks 280-286 is pivotably connected to the associated receiving fork by a pivot pin such as pivot pin 270e passing through the forks of the receiving fork and the end of the pivot link received therebetween. The end of each pivot link connected to a pivot arm is connected by a pivot pin such as pivot pins 270d and 271d. Pivot arms 270a and 271a have open forked ends for receiving pivot links such as pivot links 270b and 271b.

For purposes of describing operation of coupling mechanisms such as coupling mechanisms 270 and 271 of FIG. 4, it is noted that illustrations of FIGS. 3a and 3b reveal all pivot links of one coupling mechanism that are obscured from the view of FIG. 4. By the arrangement of side blocks, upright supports, pivot arms and pivot links, coupling mechanisms 270 and 271 are fixed in position relative to actuator housing 160, pivot arms 270a and 271a are free to rotate relative to upright supports 270f and 271f respectively, and pivot links are free to pivot relative to pivot pins through the ends thereof such as pivot pins 270d and 270e through the ends of pivot link 270b. Movement of one of nut halves 200 and 202 in a direction parallel to double ended translational direction arrow 400 is coupled by rotation of pivot arms and pivot links of coupling mechanisms 270 and 271 to the other of nut halves 200 and 202. In particular, considering coupling mechanism 270 and movement of nut half 202 in the direction parallel to double ended directional arrow 400 away from nut half 200, translation of nut half 202 effects translation of receiving fork 280 causing pivot link 270b to move in translation and rotation by virtue of the pivotable connection with receiving fork 280 and pivotable connection with pivot arm 270a. That movement of pivot link 270b effects clockwise rotation of pivot arm 270a and consequent rotation and translation of pivot link 270c (FIGS. 3a and 3b) connected between pivot arm 270a and receiving fork 284 driving receiving fork 284 in the opposite direction of movement of nut half 202. Corresponding coupling of movement of nut half 202 away from nut half 200 is effected by coupling mechanism 271 as receiving fork 286 is moved in translation and drives counterclockwise rotation of pivot arm 271a and consequent translation of receiving fork 282. With driving forces coupled from movement of nut half 202 to both receiving forks 282 and 284, equalized forces applied to those receiving forks result in opposing moments effective to eliminate or reduce any tendency for cocking of mating nut half 200 relative to side blocks 272a and 272b so that nut half 200 is driven substantially parallel to double ended translational direction arrow 400 in the direction away from nut half 200. Further, by virtue of location of receiving forks 284 and 282 spatially separated relative to the top surface of mating nut half 200, application of equalized forces to those receiving forks is effective to eliminate or reduce any tendency for tipping of mating nut half 200 relative to side blocks 272a and 272b in consequence of resulting opposing moments. In a corresponding manner, movement of nut half 202 in the direction toward nut half 200 is coupled by coupling mechanisms 270 and 271 to apply forces to receiving forks 282 and 284 so as to drive nut half 200 substantially parallel to double ended translational direction arrow 400 in the direction toward nut half 202.

By coupling of movement from nut half 202 to nut half 200 as described, a single actuator, such as linear actuator 260 for effecting translation of nut half 202 is sufficient to effect coupled motion of nut half 200. Further, by virtue of the application of equalized forces to receiving forks 282 and 284, any tendency of cocking or tipping of mating nut half 200 is eliminated or reduced by opposing moments resulting from those forces. Furthermore, by virtue of interconnection of mating nut halves of master split locking nuts 26c and 26e to, respectively, mating nut halves of slave split locking nuts 26d and 26f, actuators 260 and 262 are sufficient to open and close all of split locking nuts 26c-26f. Force from actuator 260 to nut mating nut half 202 is applied at projecting boss 202d. The face of projecting boss 202d provides a flat mounting surface for attachment of pivot connection 202e. Pivot connection 202e receives the end of the push rod of actuator 260 (shown in phantom (dashed line) in FIG. 4) that is free to translate and is connected thereto by a pivot pin 202f passing through pivot connection 202e and the end of the push rod of actuator 260 received therein. As seen in FIG. 4, pivot connection 161 connects the end of actuator 260 to actuator housing 160 so as to allow pivot of actuator 260 in a plane substantially perpendicular to the face of actuator housing 160. Pivot connections 161 and 202e allow actuator 260 to pivot so as to accommodate misalignment between the actual axis of translation of the push rod of actuator 260 and the axis of translation of nut half 202 as restrained by side blocks 272a and 272b. In a like manner, pivot connections advantageously connect actuator 262 to mating nut half 206 and actuator housing 160.

Figure 5A:
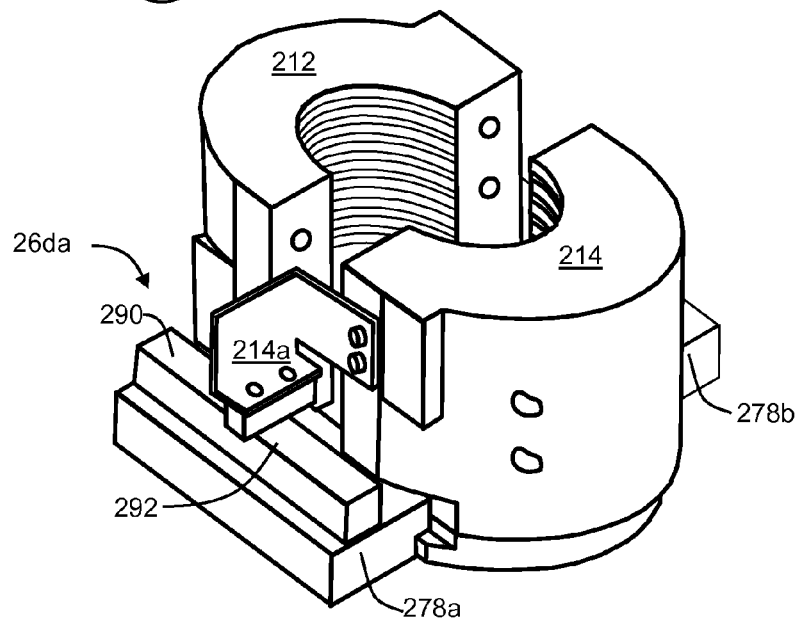
FIGS. 5a and 5b illustrate position monitoring devices associated with mating nut halves of split locking nuts in accordance with the invention.
Figure 5B:
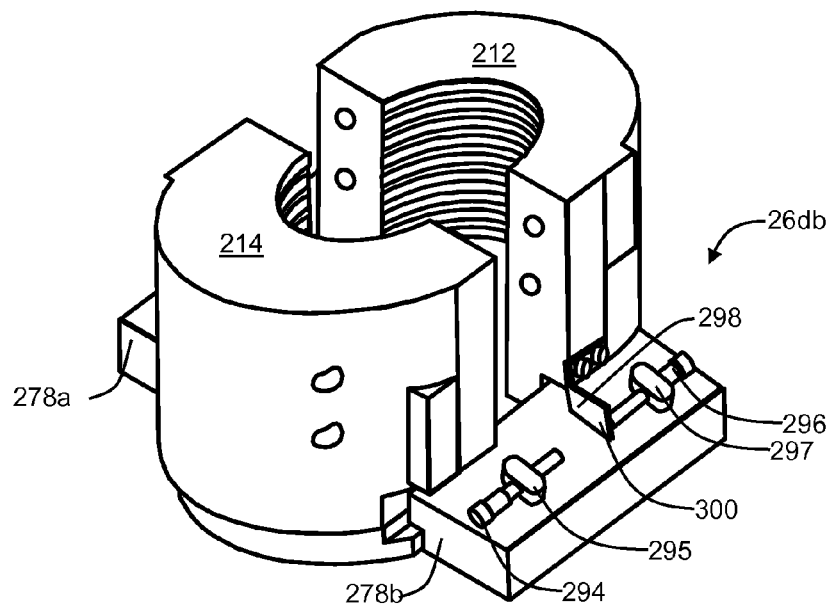

Devices for monitoring the "closed" and "open" conditions of splits nuts 26c-26f shall be described with reference to FIGS. 5a and 5b. Monitoring devices such as position monitor 56 of FIG. 1 are advantageously associated with the "slaved" split nuts for ease of access. FIGS. 5a and 5b illustrate position monitoring devices associated with "slaved" split nut 26d. Corresponding position monitoring devices are associated with "slaved" split nut 26f. As shown in FIG. 5a mating nut halves 212 and 214 are separated. Position monitor 26da comprises a position transducer such as a floating magnetic linear transducer comprising a stator 290 and an armature 292 supported by bracket 214a attached to mating nut half 214. Position transducer 26da is effective for measuring position of mating nut half 214 relative to a fixed reference position established by fixed attachment of stator 290 to side block 278a. That is, with stator 290 fixed in position, relative position of armature 292 along the length of stator 290 is represented by signals produced by position transducer 26da. Applicants have chosen to use a Hall Effect magnetic position transducer wherein armature 292 is a magnet and stator 290 is an arrangement of plural Hall Effect sensors that detect proximity of the magnet. Stator 290 is attached to side block 278a which is attached to actuator housing 160 and engages a slot in the exterior sidewall of each of mating nut halves 212 and 214 so as to allow movement of the nut halves relative to side block 278a. As mating nut half 214 is translated toward and away from mating nut half 212, signals from stator 290 represent relative position of armature 292. As is conventional, change of position can be used to measure velocity of motion of mating nut half 214.

FIG. 5b illustrates monitor 26db for detecting proximity of mating nut half 212 at limits of its range of movement. A flag member 298 is attached to mating nut half 212 and comprises a projecting end 300. Two proximity switches 294 and 296 are mounted to side block 278b by, respectively supports 295 and 297 so as to be fixed in position relative to side block 278b. Side block 278b is attached to actuator housing 160 and engages a slot in the exterior sidewall of each of mating nut halves 212 and 214 so as to allow movement of the nut halves relative to side block 278b. As mating nut half 212 moves toward and away from mating nut half 214, position of projecting end 300 of flag member 298 changes relative to the opposed ends of proximity switches 294 and 296. In the event projecting end 300 comes within the sensing range of either of proximity switches 294 and 296, a signal is generated by the affected proximity switch indicating that proximity. Position of proximity switches 294 and 296 relative to, respectively, supports 295 and 297 is set so that detection of proximity of projecting end 300 represents arrival of mating nut half 212 at a limit of its range of movement. Detection of position of mating nut half 212 at either range of movement limit is advantageously used in control of actuator 260 to cease advance beyond range limits. Additionally, as is conventional, actuator 260 can be operated to overcome external forces, for example, gravity, that would allow drift from a range limit without undesired advance beyond a range limit. Detection of unexpected departure from a range limit position can be used to, for example, set an alarm indicating a malfunction.

While the preferred embodiment of the strain rod locking mechanism comprises coupling mechanisms substantially parallel to planes perpendicular to the face of the actuator housing through which strain rods pass, it will be understood that coupling mechanisms comprised of pivot arms and pivot links could be arranged in planes substantially parallel to the face of the actuator housing without departing from the invention. The upright support arrangement of the preferred embodiment advantageously reduces the area of the actuator housing that the coupling mechanisms overly. Further, consistent with improvements contemplated by the invention, pairs of split locking nuts need not be defined in the vertical orientation illustrated. Rather, pairs of split locking nuts could equally as well be defined in horizontal orientation with the side blocks mounted above and below strain rods rather than at the sides thereof as illustrated. While actuators for operation of split locking nuts are illustrated as piston/cylinder type devices, electrically operated devices may be used in their place. Further, while the illustrated actuators are advantageously linear actuators, actuators that are driven by rotating machines and comprise transmissions, eccentrics or other known constructions for converting rotary motion to translation may be used in place of the split locking nut actuators shown.

What is claimed is:

1. An apparatus for actuation of split locking nuts of a clamp unit of a two platen injection molding machine, the clamp unit comprising: a fixed platen for supporting mold members; a movable platen assembly for supporting mating mold members; and a plurality of strain rods spanning from the fixed platen through the moveable platen assembly, the movable platen assembly comprising a mold supporting platen for supporting mating mold members, an actuator housing comprising a clamp force actuator, and a plurality of split locking nuts, each split locking nut comprising opposed movable nut halves for releaseably engaging the strain rods, the number of split locking nuts being no less than the number of strain rods, the apparatus comprising:
   a) connecting rods for connecting nut halves of two split locking nuts so as to define interconnected pairs of split locking nuts, each pair comprising a master split locking nut comprising a nut half driven by an actuator and a slave split locking nut interconnected with the master split locking nut by the connecting rods;
   b) at least one coupling mechanism for coupling motion of a driven nut half of each master split locking nut to the opposed mating nut half of the master split locking nut, wherein each coupling mechanism comprises a pivot arm and two pivot links, the pivot arm being rotatably supported so as to rotate relative to an axis of rotation fixed in position relative to the actuator housing and each pivot link being pivotably connected at one end thereof to an end of the pivot arm and pivotably connected at the distal end thereof to a mating nut half so that rotation of the pivot arm effects rotation and translation of the pivot links to couple translation of the driven nut half to equal and oppositely directed translation of the opposed mating nut half; and,
   c) an actuator for each driven nut half for effecting translation of the driven nut half toward and away from an associated strain rod, each actuator operably connected between a driven nut half and the actuator housing.

2. The apparatus according to claim 1 wherein the apparatus further comprises two coupling mechanisms for each master split locking nut, the coupling mechanisms being arranged on opposite sides of the strain rod associated with the split nut so as to apply equalized forces on opposite sides of the mating nut half to which motion of the driven nut half is coupled by the coupling mechanisms, the equalized forces producing opposing moments to reduce cocking of the mating nut half in response to the coupled forces.

3. The apparatus according to claim 2 wherein connections of distal ends of pivoting links to a mating nut half are located to result in opposing moments from forces coupled through the coupling mechanisms so as to reduce tipping of the mating nut half in response to the applied forces.

4. The apparatus according to claim 1 further comprising at least two side blocks fixed to the actuator housing in position relative to opposite sides of each strain rod to be selectably engaged by a split locking nut, the side blocks engaging the opposed mating nut halves of each split locking nut so as to restrain movement thereof bi-directionally to effect opening and closing of the split locking nuts.

5. The apparatus according to claim 4 wherein each side block engages a slot in each mating nut half so that the bottom surfaces of the mating nut halves slide across the actuator housing and the apparatus further comprises wear pads between the actuator housing and the bottom surfaces of the mating nut halves.

6. The apparatus according to claim 4 further comprising an upright support mounted to each side block associated with a master split nut, each pivot arm being pivotably supported by an upright support so that the pivot arm rotates in a plane substantially perpendicular to the plane in which the side blocks lie.

7. The apparatus according to claim 4 wherein each actuator is connected between the actuator housing and the driven nut half by pivot connections so as to accommodate misalignment between the axis of translation of the movable member of each actuator and the axis of translation of the driven nut half as restrained by the side blocks.

8. The apparatus according to claim 1 further comprising at least one position monitor for each pair of interconnected split locking nuts, the position monitor producing signals representing position of at least one mating nut half relative to at least one strain rod to be selectably engaged by the split locking nuts of each split locking nut pair.

9. The apparatus according to claim 8 wherein the position monitors comprise a position transducer for measuring position of a mating nut half relative to a fixed reference and a pair of proximity sensors for detecting position of a mating nut half at either end of a range of motion of the mating nut half.

10. The apparatus according to claim 1 wherein the connecting rods interconnecting mating nut halves of a master split locking nut with mating nut halves of a slave split locking nut are arranged so as to produce opposing moments on the mating nut halves of the slave split locking nuts to reduce cocking and tipping of the mating nut halves of the slave split locking nuts in response to the transferred forces from the master split locking nuts.

11. An apparatus for actuation of split locking nuts of a clamp unit of a two platen injection molding machine, the clamp unit comprising: a fixed platen for supporting mold members; a movable platen assembly for supporting mating mold members; and a plurality of strain rods spanning from the fixed platen through the moveable platen assembly, the movable platen assembly comprising a mold supporting platen for supporting mating mold members, an actuator housing comprising a clamp force actuator, and a plurality of split locking nuts, each split locking nut comprising opposed movable nut halves for releaseably engaging the strain rods, the number of split locking nuts being no less than the number of strain rods, the apparatus comprising:
   a) at least two side blocks fixed to the actuator housing in position relative to opposite sides of each strain rod to be selectably engaged by a split locking nut, the side blocks engaging the opposed mating nut halves of each split locking nut so as to restrain movement thereof bi-directionally to effect opening and closing of the split locking nuts;
   b) connecting rods for connecting nut halves of two split locking nuts so as to define interconnected pairs of split locking nuts, each pair comprising a master split locking nut comprising a nut half driven by an actuator and a slave split locking nut interconnected with the master split locking nut by the connecting rods;
   c) at least one coupling mechanism for coupling motion of a driven nut half of each master split locking nut to the opposed mating nut half of the master split locking nut, wherein each coupling mechanism comprises a pivot arm and two pivot links, the pivot arm being rotatably supported so as to rotate relative to an axis of rotation fixed in position relative to the actuator housing and each pivot link being pivotably connected at one end thereof to an end of the pivot arm and pivotably connected at the distal end thereof to a mating nut half so that rotation of the pivot arm effects rotation and translation of the pivot links to couple translation of the driven nut half to equal and oppositely directed translation of the opposed mating nut half; and,
   d) an actuator for each driven nut half for effecting translation of the driven mating nut half toward and away from an associated strain rod, each actuator operably connected between a driven nut half and the actuator housing.

12. The apparatus according to claim 11 wherein each side block engages a slot in each mating nut half so that the bottom surfaces of the mating nut halves slide across the actuator housing and the apparatus further comprises wear pads between the actuator housing and the bottom surfaces of the mating nut halves.

13. The apparatus according to claim 11 wherein the apparatus further comprises two coupling mechanisms for each master split locking nut, the coupling mechanisms being arranged on opposite sides of the strain rod associated with the split nut so as to apply equalized forces on opposite sides of the mating nut half to which motion of the driven mating nut half is coupled by the coupling mechanisms, the equalized forces producing opposing moments to reduce cocking of the mating nut half in response to the coupled forces.

14. The apparatus according to claim 13 wherein connections of distal ends of pivoting links to a mating nut half are located to result in opposing moments from forces coupled through the coupling mechanisms so as to reduce tipping of the mating nut half in response to the applied forces.

15. The apparatus according to claim 11 further comprising an upright support mounted to each side block associated with a master split nut, each pivot arm being pivotably supported by an upright support so that the pivot arm rotates in a plane substantially perpendicular to the plane in which the side blocks lie.

16. The apparatus according to claim 11 wherein each actuator is connected between the actuator housing and a driven nut half by pivot connections so as to accommodate misalignment between the axis of translation of the movable member of the actuator and the axis of translation of the driven nut half as restrained by the side blocks.

17. The apparatus according to claim 11 further comprising at least one position monitor for each pair of interconnected split locking nuts, the position monitor producing signals representing position of at least one mating nut half relative to at least one strain rod to be selectably engaged by the split locking nuts of each split locking nut pair.

18. The apparatus according to claim 17 wherein the position monitors comprise a position transducer for measuring position of a mating nut half relative to a fixed reference and a pair of proximity sensors for detecting position of a mating nut half at either end of a range of motion of the mating nut half.

19. The apparatus according to claim 11 wherein the connecting rods interconnecting mating nut halves of a master split locking nut with mating nut halves of a slave split locking nut are arranged so as to produce opposing moments on the mating nut halves of the slave split locking nuts to reduce cocking and tipping of the mating nut halves of the slave split locking nuts in response to the transferred forces from the master split locking nuts.

* * * * *